(12) United States Patent
Singh et al.

(10) Patent No.: US 9,288,713 B2
(45) Date of Patent: Mar. 15, 2016

(54) METHOD AND APPARATUS FOR DYNAMICALLY CHANGING MODES OF A RELIABLE TRANSPORT PROTOCOL

(75) Inventors: Ajoy K. Singh, Round Lake, IL (US); Mukesh Bhatla, Algonquin, IL (US); Jay P. Jayapalan, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 641 days.

(21) Appl. No.: 11/338,015

(22) Filed: Jan. 24, 2006

(65) Prior Publication Data

US 2006/0171396 A1    Aug. 3, 2006

Related U.S. Application Data

(60) Provisional application No. 60/648,683, filed on Jan. 31, 2005.

(51) Int. Cl.
*H04W 28/06* (2009.01)
*H04L 1/18* (2006.01)
*H04W 28/14* (2009.01)
*H04W 80/00* (2009.01)

(52) U.S. Cl.
CPC ............. *H04W 28/06* (2013.01); *H04L 1/1825* (2013.01); *H04L 1/1812* (2013.01); *H04L 1/1877* (2013.01); *H04W 28/14* (2013.01); *H04W 80/00* (2013.01)

(58) Field of Classification Search
USPC ................ 370/328, 338, 394, 465, 466, 469; 455/69
See application file for complete search history.

(56) References Cited

U.S. PATENT DOCUMENTS

| | | | |
|---|---|---|---|
| 6,112,084 A * | 8/2000 | Sicher et al. .................. 370/337 |
| 6,181,686 B1 * | 1/2001 | Hamalainen et al. ......... 370/347 |
| 6,307,880 B1 * | 10/2001 | Evans et al. .................... 375/222 |
| 6,542,490 B1 * | 4/2003 | Ahmadvand et al. ......... 370/338 |
| 6,625,133 B1 * | 9/2003 | Balachandran et al. ...... 370/329 |
| 6,795,435 B1 * | 9/2004 | Jouppi et al. .................. 370/394 |
| 7,145,889 B1 * | 12/2006 | Zhang et al. .................. 370/329 |
| 7,215,965 B2 * | 5/2007 | Fournier et al. ............ 455/456.1 |
| 2002/0072382 A1 | 6/2002 | Fong et al. |
| 2002/0191544 A1 | 12/2002 | Cheng et al. |
| 2003/0039269 A1 * | 2/2003 | Ala-Vannesluoma ........ 370/469 |
| 2004/0039833 A1 | 2/2004 | Ludwig et al. |
| 2004/0192396 A1 * | 9/2004 | Fournier ....................... 455/563 |
| 2006/0046661 A1 * | 3/2006 | Ekvetchavit et al. ....... 455/67.11 |

FOREIGN PATENT DOCUMENTS

WO    9722196    6/1997

* cited by examiner

*Primary Examiner* — Hassan Phillips
*Assistant Examiner* — Saba Tsegaye
(74) *Attorney, Agent, or Firm* — Lerner, David, Littenberg, Krumholz & Mentlik, LLP

(57) ABSTRACT

A communication device minimizes an opportunity for a queue stall during a communication session employing a reliable transport protocol by setting a current mode of operation for a Radio Link Protocol (RLP) and, based on a quality of an air interface, switching to an RLP mode of operation different from the current mode during the communication session.

20 Claims, 3 Drawing Sheets

METHOD AND APPARATUS FOR DYNAMICALLY CHANGING MODES OF A RELIABLE TRANSPORT PROTOCOL

CROSS-REFERENCE TO RELATED APPLICATION

This application claims priority from provisional application Ser. No. 60/648,683, entitled "METHOD AND APPARATUS FOR DYNAMICALLY CHANGING MODES OF A RELIABLE TRANSPORT PROTOCOL," filed Jan. 31, 2005, which is commonly owned and incorporated herein by reference in its entirety.

FIELD OF THE INVENTION

The present invention relates generally to wireless communication systems, and, in particular, to a wireless communication system that employs a reliable transport protocol.

BACKGROUND OF THE INVENTION

When information, such as voice or data, is received by a wireless communication device, such as a mobile station or a base transceiver station, the information is digitized, if not already in a digital format, and processed by one or more tasks performed by a respective processor of the communication device. The digitized data is then processed pursuant to a known protocol scheme. A layered representation of protocols is commonly known as a protocol stack. A protocol stack commonly used for the interconnection of network systems is the TCP/IP Suite, named for two of the protocols, Transmission Control Protocol (TCP) and Internet Protocol (IP), in the stack. The TCP/IP protocol stack includes five layers, which layers are, from highest to lowest, an Application Layer, a Transport Layer, a Network Layer, a Link Layer, and a Physical Layer.

Layer 2, that is, the Link Layer or Data-Link Layer, provides the functional and procedural means to transfer data between network entities and to detect and possibly correct errors that may occur in the Physical Layer. Layer 2 implements protocols that assure a reliable transmission of data in a communication system that guarantees delivery of data. In order to assure a reliable transmission, Layer 2 implements a reliable transport protocol, such as Radio Link Protocol (RLP)/Radio Link Control (RLC), to re-transmit frames of data that were lost over the radio interface.

When a reliable transport protocol is used and a receiving communication device is unable to correctly decode a received frame, a corresponding transmitting communication device re-transmits the incorrectly received frame. For example, a receiving communication device that is unable to correctly decode a received frame may transmit a NAK to the transmitting communication device that identifies a sequence number of the erroneous frame. In response to receiving the NAK, the transmitting communication device re-transmits the frame. In order to re-transmit erroneously received frames, the transmitting communication device is required to buffer all transmitted frames in an RLP buffer until the transmitting communication device determines that the frames have been correctly received. When a buffered frame is incorrectly received, all subsequently transmitted frames are maintained in the buffer until the incorrectly received frame is corrected by re-transmission or is aborted. With the advent of high data rate systems, such as a CDMA (Code Division Multiple Access) 1XEV-DV communication system, data rates as high as 3 Megabits per second (Mbps) may be achieved. In such a system, assuming a maximum buffer space of 2048 Packet Data Units (PDUs), the transmit buffer may fill up in 2048 (PDUs)*46 (bytes per PDU)*8 (bits per byte)/3 Mbps=250 milliseconds (ms). When a lower end of an RLP re-transmission window, that is, L_V(N), which is a sequence number of a next RLP frame needed by the receiving communication device for a sequential delivery of frames to a higher layer, is stuck due to an incorrectly received frame while an upper end of the window, that is, L_V(S), which is a sequence number of a next RLP frame to be transmitted by the transmitting communication device, rapidly expands due to high bandwidth flow, it is possible to exhaust the transmit buffer space, leading to a queue stall, that is, a stall in a transmission of new frames. The queue stall produces transmission delays and a drop in a data rate provided to a user.

Therefore a need exists for a method and an apparatus that minimizes the occurrences of a queue stall during a communication session employing a reliable transport protocol.

DETAILED DESCRIPTION OF THE INVENTION

To address the need for a method and an apparatus that method and an apparatus that minimizes the occurrences of a queue stall during a communication session employing a reliable transport protocol, a communication device is provided that minimizes an occurrence of a queue stall during a communication session employing a reliable transport protocol by setting a current mode of operation for a Radio Link Protocol (RLP) and, based on a quality of an air interface, switching to an RLP mode of operation different from the current mode of operation during the communication session.

Generally, an embodiment of the present invention encompasses a method for minimizing an occurrence of a queue stall during a communication session employing a reliable transport protocol. The method comprises setting a current mode of operation for a Radio Link Protocol (RLP) and switching to an RLP mode of operation different from the current mode during the communication session.

Another embodiment of the present invention encompasses a communication device capable of changing a mode of operation of a Radio Link Protocol (RLP) during a communication session. The communication device comprises a means for setting a current mode of operation for an RLP and a means for switching to an RLP mode of operation different from the current mode during the communication session.

Figure 1:
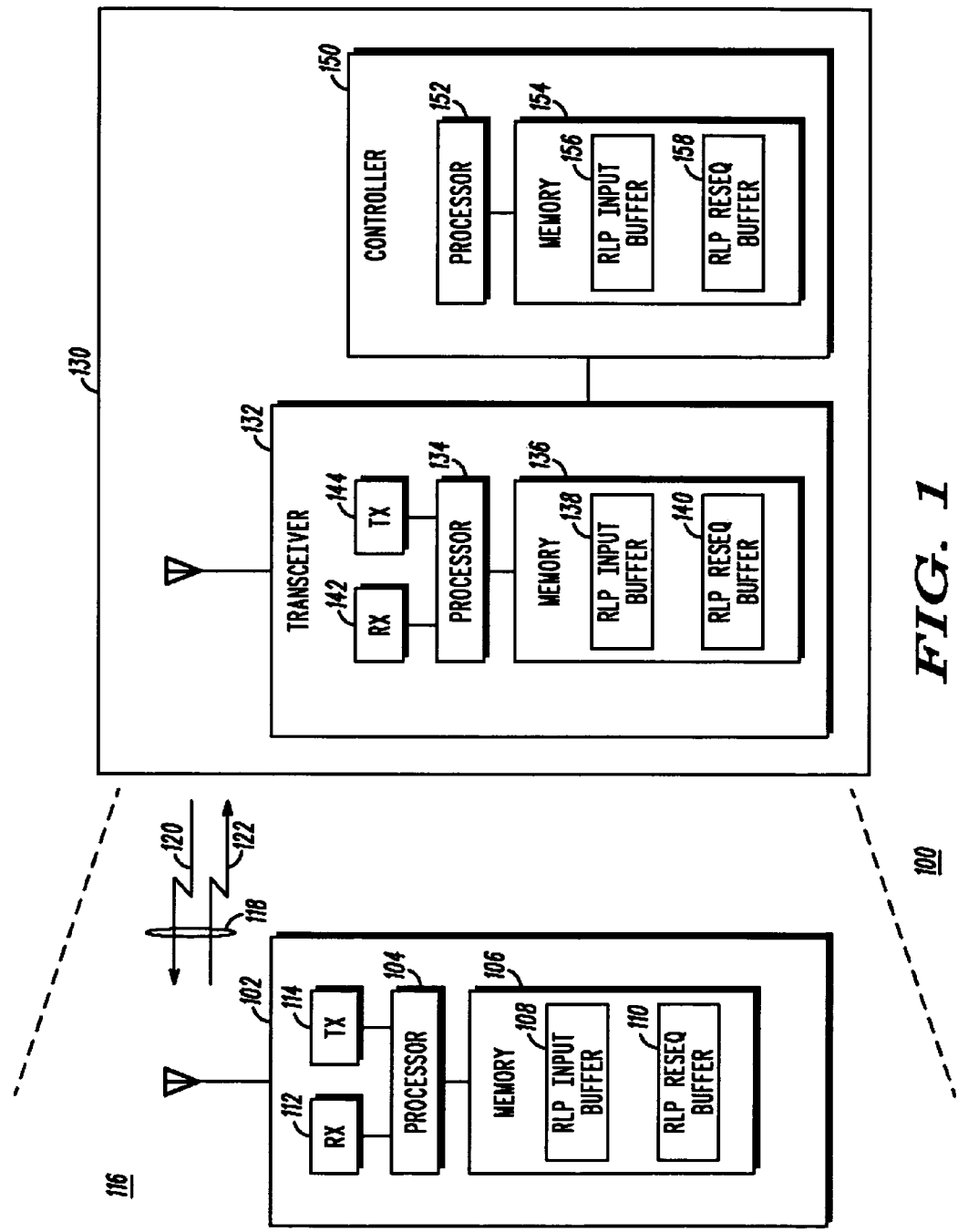
FIG. 1 is a block diagram of a wireless communication system in accordance with an embodiment of the present invention.

The present invention may be more fully described with reference to FIGS. 1-3. FIG. 1 is a block diagram of a wireless communication system 100 in accordance with an embodiment of the present invention. In one embodiment of the present invention, communication system 100 may be a high rate packet data (HRPD) communication system, such as a CDMA (Code Division Multiple Access) 1XEV-DO or 1XEV-DV communication system and the like. However, those who are of ordinary skill in the art realize that communication system 100 may operate in accordance with any one of a variety of wireless high rate packet data communication systems, such as but not limited to General Packet Radio Service (GPRS)/Enhanced Data for Global Evolution (EDGE), Universal Mobile Telecommunication Service (UMTS), or Fourth Generation (4G) systems such as OFDM (Orthogonal Frequency Division Multiple Access).

Still referring to FIG. 1, communication system 100 includes a wireless access network 130, such as a Radio Access Network (RAN) or a Base Station (BS), that provides voice and/or data to be wirelessly communicated to and/or from a mobile station (MS) 102, such as but not limited to a cellular phone, a radiotelephone, or a wireless communication-enabled personal computer, laptop computer, or personal digital assistant (PDA). Access network 130 includes at least one transceiver 132, such as a Base Transceiver Station (BTS) or a Node B, that is operably coupled to a controller 150, such as a Base Station Controller (BSC) or a Radio Network Controller (RNC).

Access network 130 provides communications services to mobile stations, such as MS 102, located in a coverage area 116 serviced by the access network via an air interface 118. Air interface 118 includes a forward link 120 having multiple logical and transport channels including at least one forward link traffic channel, such as a Packet Data Channel (PDCH) to support high speed data services, and at least one forward link signaling channel, such as an FCCCH (Forward Common Control Channel). The forward link may or may not further include a paging channel, such as a PCH (Paging Channel). For example, in a CDMA 2000 1XEV-DO communication system, the paging function is performed using a Route Update Protocol. Air interface 118 further includes a reverse link 122 having multiple logical and transport channels including at least one reverse link traffic channel, such as an FCH (Fundamental Channel), at least one reverse link signaling channel, such as a DCCH (Dedicated Control Channel), and an access channel, such as an ACH (Access Channel).

Each of MS 102, transceiver 132, and controller 150 includes a respective processor 104, 134, 152 such as one or more microprocessors, microcontrollers, digital signal processors (DSPs), combinations thereof or such other devices known to those having ordinary skill in the art. The particular operations/functions of processors 104, 134, and 152 and respectively thus of MS 102, transceiver 132, and controller 150 are determined by an execution of software instructions and routines that are stored in a respective at least one memory device 106, 136, 154 associated with the processor, such as random access memory (RAM), dynamic random access memory (DRAM), and/or read only memory (ROM) or equivalents thereof, that store data and programs that may be executed by the corresponding processor.

Each of MS 102 and transceiver 132 further comprises a respective receiver 112, 142 and a respective transmitter 114, 144 that are each coupled to the respective processor 104, 134. Each of at least one memory device 106, 136, and 154 or in another embodiment of the present invention, each of processor 104, 134, and 152 further includes a respective Radio Link Protocol (RLP) input buffer 108, 138, 156 that stores RLP frames for subsequent transmission via air interface 118, and a respective RLP resequencing buffer 110, 140, 158 that stores RLP frames received via the air interface.

The embodiments of the present invention preferably are implemented within any of MS 102, transceiver 132, and controller 150, and more particularly with or in software programs and instructions stored in the respective at least one memory device 106, 136, and 154 and executed by respective processors 104, 1134, and 152. The invention as described in the embodiments herein may be applied to the reverse link when the receiver functionality described here is implemented at transceiver 132 and/or controller 150, and invention as described in the embodiments herein may be applied to the forward link when the receiver functionality described here is implemented at MS 102. However, one of ordinary skill in the art realizes that the embodiments of the present invention alternatively may be implemented in hardware, for example, integrated circuits (ICs), application specific integrated circuits (ASICs), and the like, such as ASICs implemented in one or more of the wireless communication devices MS 102 and transceiver 132 and associated controller 150. Based on the present disclosure, one skilled in the art will be readily capable of producing and implementing such software and/or hardware without undo experimentation.

When information, such as voice, user data, or control data, is received by a wireless communication device, such as MS 102 or transceiver 132, for transmission via air interface 118, the information is digitized, if not already in a digital format, and processed by one or more tasks performed by respective processors 104 and 134. The digitized data is then processed pursuant to the wireless communication technology employed by system 100 and a known protocol scheme. Similarly, when an instruction to convey a known control message is received by the wireless communication device, the wireless communication device assembles the control message pursuant to the wireless communication technology employed and the known protocol scheme.

At the level of interconnected network systems, such as system 100, protocol schemes have been developed to facilitate the exchange of data among multiple elements of the system. A protocol scheme specifies the manner of interpreting every data bit of a data packet exchanged across the networks. In order to simplify network designs, several well-known techniques of layering the protocols have been developed. Protocol layering divides the network design into functional layers and then assigns separate protocols to perform each layer's task. By using protocol layering, the protocols are kept simple, each with a few well-defined tasks. The protocols can then be assembled into a useful whole, and individual protocols can be removed or replaced as needed.

A layered representation of protocols is commonly known as a protocol stack. In one embodiment of the present invention, communication system 100 uses a modified version of the well-known Transmission Control Protocol (TCP)/Internet Protocol (IP) protocol stack, although one of ordinary skill in the art realizes that any protocol stack that implements reliable communications may be used herein. The TCP/IP protocol stack includes, from highest to lowest, an Application Layer, a Transport Layer, a Network Layer, a Link Layer, and a Physical Layer. Layer 2, that is, the Link Layer or Data-Link Layer, provides the functional and procedural means to transfer data between network entities and to detect and possibly correct errors that may occur in the Physical Layer. Layer 2 implements protocols that assure a reliable transmission of data in a communication system that guarantees delivery of data. In order to assure a reliable transmission, Layer 2 may implement Radio Link Protocol (RLP)/Radio Link Control (RLC) or another known automatic repeat request (ARQ) scheme to re-transmit frames of data that were lost over the radio interface. A reliable protocol, such as TCP, may use RLP/RLC to guarantee that messages reach their destination complete and uncorrupted and in the order they were sent.

Figure 2:
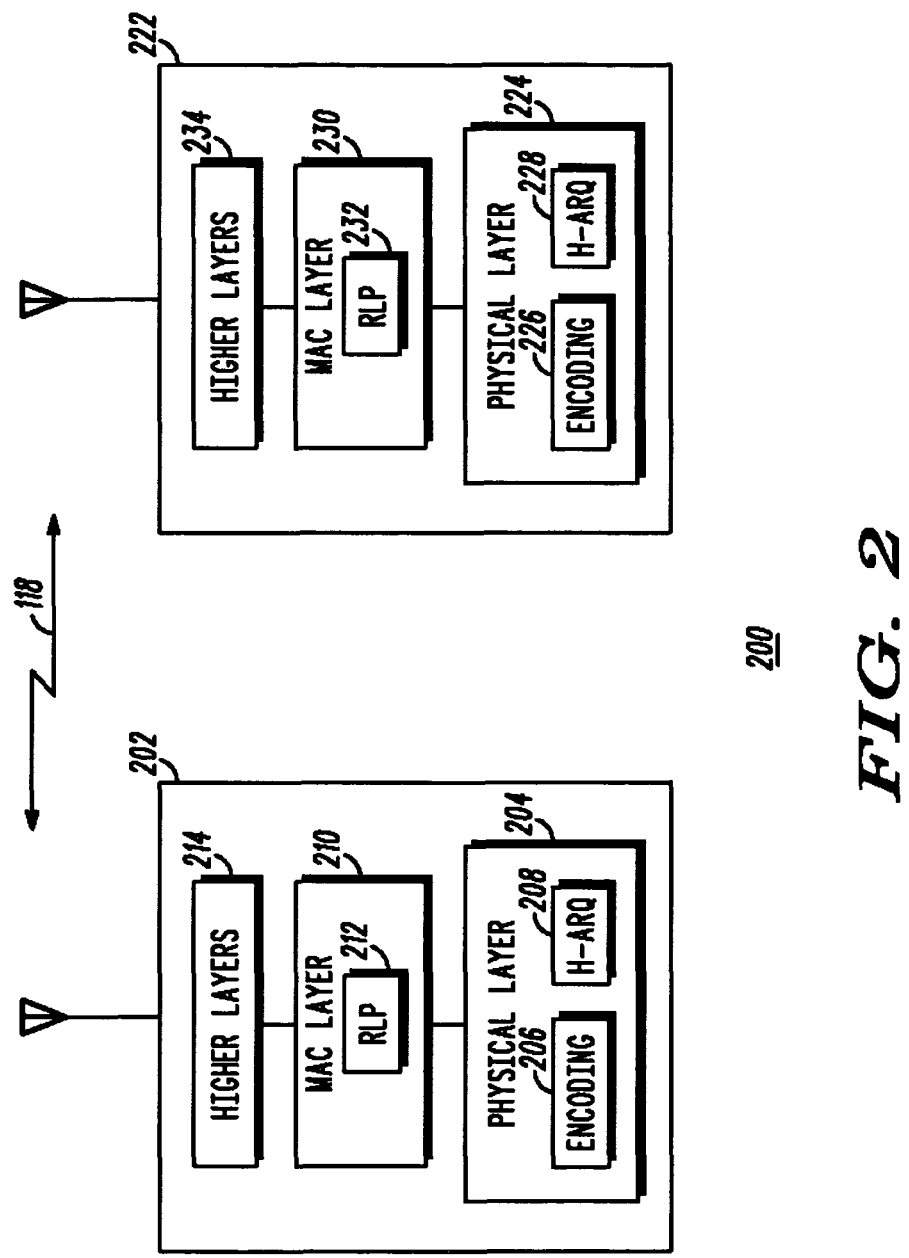
FIG. 2 is a block diagram of a receiving communication device and a transmitting communication device capable of operating in the communication system of FIG. 1 in accordance with an embodiment of the present invention.

FIG. 2 is a block diagram 200 of an architecture of a transmitting communication device 202 and a receiving communication device 222 of communication system 100 in accordance with an embodiment of the present invention. Each of MS 102 and transceiver 132, or transceiver 132 operating in association with controller 150, may function as either transmitting communication device 202 or receiving communication device 222 when operating in communication system 100. For example, when transceiver 132 is operating as a transmitting communication device or a receiving communication device in association with controller 150, then the functionality of such communication device may reside in transceiver 132 or controller 150 or may be distributed among transceiver 132 and controller 150. Transmitting communication device 202 and receiving communication device 222 are each configured to enable the use of forward link 120 and reverse link 122 of air interface 118 and to provide reliable wireless communication. As such, each of transmitting communication device 202 and receiving communication device 222 can be configured to verify an accuracy of received frames, to request or provide a re-transmission of incorrectly received or decoded frames at both a Physical Layer and a Link Layer, and further to distinguish between good frames and erased frames.

An architecture of transmitting communication device 202 includes a Physical Layer 204, a Medium Access Control (MAC) Sublayer 210 of a Link Layer, and higher layers 214. Physical Layer 204 includes an encoding device 206 and Hybrid Automatic Repeat reQuest (H-ARQ) functionality 208, and MAC Sublayer 210 includes a Radio Link Protocol (RLP) transmitter 212. Each of elements 206, 208, and 212 may be implemented in a processor of the transmitting device, such as processors 104, 134, and 152 of MS 102, transceiver 132, and controller 150, based on software stored in an associated at least one memory device 106, 136, 154 or may be implemented in hardware in a manner as can readily be determined by one of ordinary skill in the art.

RLP transmitter 212 receives data from a data source, such as digitized voice data, non-real time data, or any type of IP packet, for a device user or application layer data from a data application such as an external personal computer (not shown) or a mobile data application, for example, a wireless access protocol (WAP) browser (not shown), voice-over-IP application, or a dispatch application. RLP transmitter 212 performs MAC Sublayer 210 functionality on the data, such as breaking up IP packets received from higher layers 214 into packet data units (PDUs) and appending an RLP header comprising sequentially increasing RLP sequence (SEQ) numbers to the PDUs to produce an RLP frame. The sequence number corresponds to a position, in time, of the RLP frame relative to other RLP frames generated by transmitting communication device 202 as part of a communication session. The sequence number allows receiving communication device 222 to receive the RLP frames in any order and then to reorder the frames in the order in which the frames were generated. Transmitting communication device 202 stores transmitted RLP frames in an RLP input buffer of the transmitting communication device, such as RLP input buffers 108 and 138, so that an erroneously received frame may be retrieved and retransmitted. When an RLP frame is retransmitted, the SEQ value of the original RLP frame is maintained. A retransmitted frame data field (REXMIT) of the RLP frame is set to '1' when the frame is a retransmitted data frame, and otherwise is set to '0'.

Encoding device 206 typically includes a coder (not shown), such as a convolutional or turbo coder, that encodes the frame pursuant to a known coding scheme. Encoding device 206 further includes an error correction block, such as a cyclic redundancy check (CRC) block, (not shown) that generates and applies overhead bits to the frames framed by the source application to provide for error protection of the frames. The encoded data is then forwarded to a transmitter, such as transmitters 114 and 144, where the encoded data may be interleaved, spread by a spreading code, modulated onto a carrier, and amplified to produce an output signal that is transmitted to receiving communication device 210 via an air interface, such as air interface 118.

H-ARQ functionality 208 implements protocols that assure a reliable transmission of data in communication system 100 and that guarantee delivery of data at the Physical Layer by providing for a re-transmission of erroneously received data. In response to receiving a negative acknowledgment (NAK) from an H-ARQ functionality of receiving communication device 222 that identifies at least a portion of an erroneously received frame, H-ARQ functionality 208 re-transmits the erroneously received frame or the identified portion. After a predetermined maximum number of re-transmissions, H-ARQ functionality 208 may abort the frame, in which event H-ARQ functionality 208 informs the H-ARQ functionality of receiving communication device 222 that the frame has been aborted.

An architecture of receiving communication device 222 includes a Physical Layer 224, a Medium Access Control (MAC) Sublayer 230 of a Link Layer, and higher layers 234. Physical Layer 224 includes a decoding device 226 and Hybrid Automatic Repeat reQuest (H-ARQ) functionality 228, and MAC Sublayer 230 includes a Radio Link Protocol (RLP) receiver 232. Each of elements 226, 228, and 232 may be implemented in a processor of the receiving device, such as processors 104 and 134 of MS 102 and transceiver 132, based on software stored in an associated at least one memory device 106, 136, or may be implemented in hardware in a manner as can readily be determined by one of ordinary skill in the art.

A wireless receiver (not shown) of receiving communication device 222, such as receivers 112 and 142, receives the transmitted output signal and demodulates, despreads, and de-interleaves the received signal. The resulting signal is forwarded to decoding device 224. Decoding device 224 typically includes a decoder (not shown), such as a convolutional or turbo decoder, that decodes the frame pursuant to a coding scheme utilized by FEC processing device 206. Decoding device 224 further includes a an error detection and correction block, such as cyclic redundancy check (CRC) block, (not shown) that performs error detection and correction on received frames. Decoding device 224 can detect and correct errors introduced to the transmitted signal by air interface 118, thereby recovering original input data, or in other words the original data bits and frames, even when a significant number of errors are present in the received data.

In conjunction with H-ARQ functionality 208, H-ARQ functionality 228 implements protocols that assure a reliable transmission of data in communication system 100 and that guarantee delivery of data at the Physical Layer by providing for a re-transmission of erroneously received data. In a CDMA 1XEV-DV communication system, H-ARQ functionality 228 requests re-transmissions of erroneously received data by conveying a NAK to H-ARQ functionality 208 of transmitting communication device 202, which NAK identifies at least a portion of an erroneously received frame. H-ARQ functionality 228 further provides for improved throughput by combining, rather than discarding, erroneously received transmissions with a current transmission.

RLP receiver 232 performs MAC Sublayer functionality on the RLP frames received from transmitting communication device 202 and via Physical Layer 224. Correctly received RLP frames are stored in an RLP resequencing buffer of receiving communication device 222, such as RLP resequencing buffers 110 and 140, where the frames are reordered based on the sequence (SEQ) number included in the RLP header of each frame. The processor of receiving communication device 222, such as processors 104 and 134, then extracts the received frames, in the frames' sequential order, from the reordered frames stored in the RLP resequencing buffer and forwards the extracted frames to higher layers 234 for further processing. If RLP receiver 232 detects a missing sequence number, or if a frame has not been correctly decoded, the RLP receiver can request re-transmission by sending or causing to be sent a NAK to transmitting communication device 202, for example, to MS 102 if detected by transceiver 132, or to transceiver 130 if detected by the MS. When consecutively numbered good frames are received by RLP receiver 232, the RLP receiver passes the good frames, in sequential order, to higher layers 234 for further processing. However, when RLP receiver 232 detects a missing sequence number or a frame that has not been correctly decoded, then the RLP receiver stores all subsequently received frames in the RLP resequencing buffer until the missing or incorrectly decoded frame is re-transmitted and correctly received or is aborted.

During a communication session between transmitting communication device 202 and receiving communication device 222 and due to fading, congestion, a poor condition of forward link 120 or reverse link 122, or a number of other scenarios known to one of ordinary skill in the art, RLP radio frames transmitted over air interface 118 may be erroneously received, resulting in erased frames. To correct these Link Layer errors, RLP transmitter 212 of transmitting communication device 202 buffers the sent data in a corresponding RLP input buffer and re-sends that data when an appropriate NAK is received.

As is known in the art, transmitting communication device 202 updates the L_V(N)_peer when an L_V(N) update message, such as a FILL FRAME message, is received by the transmitting communication device from receiving communication device 222. The L_V(N) of receiving communication device 222 and the L_V(N)_peer of transmitting communication device 202 keep increasing as long as all transmitted RLP frames are correctly received by the receiving communication device and corresponding update messages, such as FILL FRAMEs comprising L_V(N) update messages, are sent by the receiving communication device to the transmitting communication device. However, when an RLP frame is erased, for example, due to poor conditions of air interface 118, the L_V(N) of receiving communication device 222 shall stall until a re-transmitted RLP frame with sequence number L_V(N) is received by RLP receiver 232 of the receiving communication device or the RLP receiver declares the missing frame as aborted, adjusts the L_V(N), and sends an L_V(N) update message to transmitting communication device 202. Meanwhile, while awaiting an adjustment of L_V(N)_peer, RLP transmitter 212 of transmitting communication device 202 queues the missing frame and all subsequently transmitted frames in an RLP input buffer, such as RLP input buffers 108, 138, and 156. In a high bandwidth communication session, for example, a data session utilizing a PDCH of forward link 120, the RLP input buffer may quickly fill up and transmitting communication device 202 will not be able to transmit a new RLP frame unless the missing frame is either corrected by re-transmission or is aborted and L_V(N)_peer is updated, resulting in a queue stall.

To minimize the occurrences of such a queue stall, communication system 100 provides for a dynamic switching an RLP mode of operation depending upon a current condition of air interface 118. When radio frequency (RF) conditions are good, transmitting communication device 202 switches the RLP mode to a transparent mode of operation. In the transparent mode of operation, RLP is not required to perform error correction and, therefore, window stall is not possible. When poor conditions are detected, transmitting communication device 202 switches the RLP mode to a non-transparent mode of operation, in which RLP uses retransmission-based error correction and window stall is possible. Switching to a transparent mode of operation is suitable for good RF conditions as the error rates of transmissions in good RF conditions are low, so removing RLP processing overhead further enhances the data handling capacity of communication system 100 by minimizing any RLP-related signaling. Whatever radio frames are erased, for example, due to RF conditions of air interface 118, the erased frames might then be recovered by the higher layers 234 of receiving communication device 222.

Figure 3:
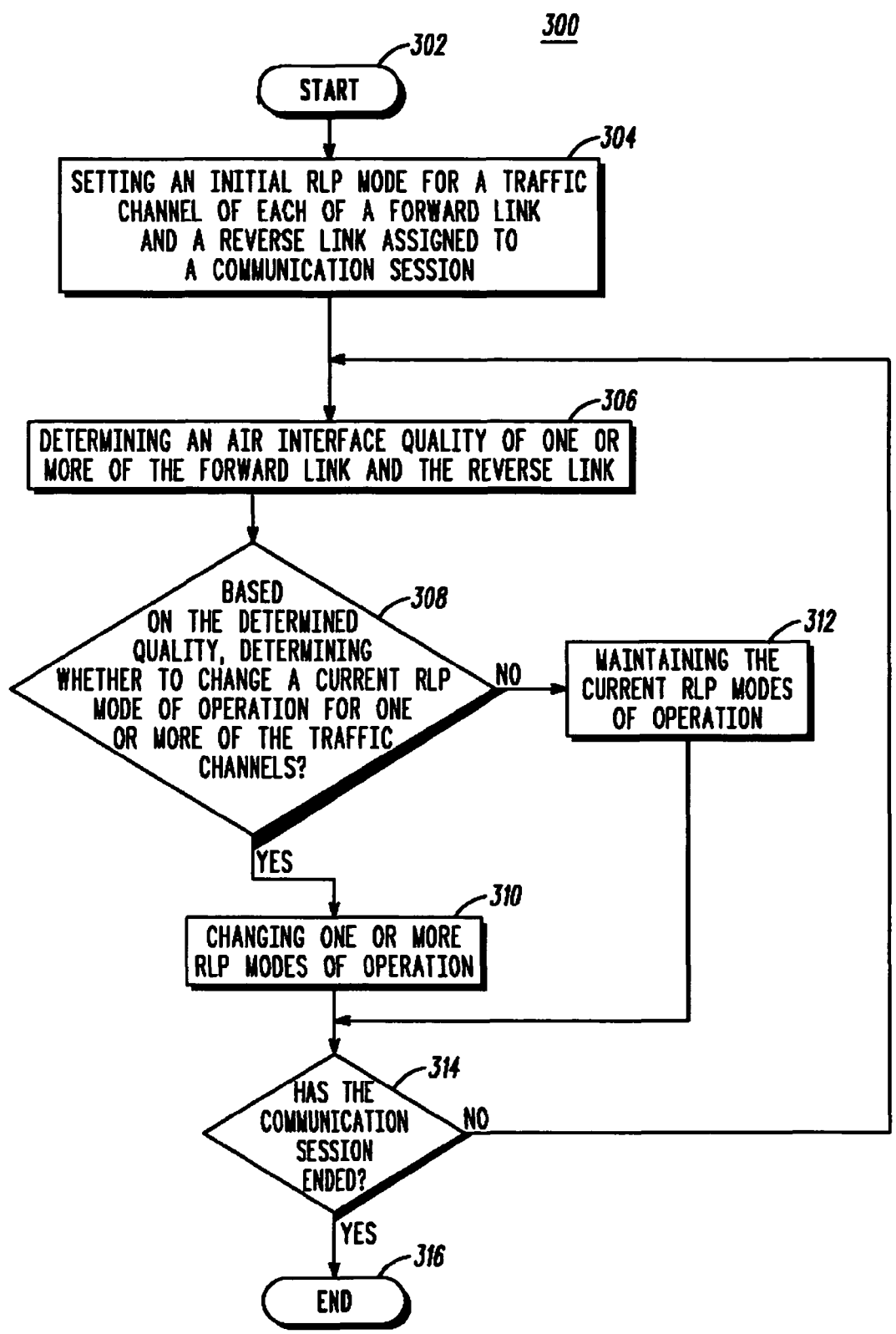
FIG. 3 is a logic flow diagram of a method executed by the communication system of FIG. 1 for dynamically changing Radio Link Protocol modes in accordance with an embodiment of the present invention.

FIG. 3 is a logic flow diagram 300 of the method executed by communication system 100 for dynamically switching RLP modes of operation in accordance with an embodiment of the present invention. Logic flow diagram 300 begins (302) when a communication session, preferably a high speed data communication session such as High Rate Packet Data (HRPD) communication session, is established between transmitting communication device 202 and receiving communication device 222, such as between MS 102 and transceiver 132. During the communication session, each of MS 102 and transceiver 132 may at times be acting as transmitting communication device 202 and at other times be acting as receiving communication device 222.

As part of the establishment of the communication session, a traffic channel is assigned to the communication session in each of forward link 120 and reverse link 122 of air interface 118. For each assigned traffic channel, an initial RLP mode of operation is set (304). That is, with respect to forward link 120, an initial RLP mode of operation is set with respect to an RLP transmitter 212 of transceiver 132 and/or controller 150 and an RLP receiver 232 of MS 102, and with respect to reverse link 122, an initial RLP mode of operation is set with respect to an RLP transmitter 212 of MS 102 and an RLP receiver 232 of transceiver 132 and/or controller 150. The RLP modes of operation established for links 120 and 122 may be the same or may be different.

Each initial RLP mode of operation may be a transparent mode of operation or a non-transparent mode or operation. In a non-transparent mode of operation, RLP is required to perform error correction, so RLP transmitter 212 of transmitting communication device 202 and RLP receiver 232 of receiving communication device 222 are each enabled. As described in detail above, when operating in a non-transparent RLP mode, RLP transmitter 212 and RLP receiver 232 respectively store RLP frames in an RLP input buffer 108, 138, 156 and an RLP resequencing buffer 110, 140, 158. As frames are transmitted by RLP transmitter 212 and correctly received and passed along to higher layers 234 by RLP receiver 232, the RLP transmitter and the RLP receiver exchange update messages, such as FILL Frame L_V(N) update messages, with respect to a window size of RLP frames buffered in the corresponding RLP buffer and adjust a L_V(N)_peer value and L_V(S) value as appropriate.

In addition, when RLP receiver 232 detects an erroneously received frame, the RLP receiver NAK's the frame and RLP transmitter 212 re-sends the frame. After a predetermined or agreed upon number of re-transmissions of a frame and corresponding number of NAKs, which predetermined or agreed upon number of re-transmissions is stored in a memory, such as at least one memory devices 106, 136, 154 of each of transmitting communication device 202 and receiving communication device 222, RLP receiver 232 declares the erroneously received frame as aborted, adjusts the L_V(N), and sends an L_V(N) update message to transmitting communication device 202.

In a transparent mode of operation, RLP is not required to perform error correction, so RLP transmitter 212 of transmitting communication device 202 and RLP receiver 232 of receiving communication device 222 are each disabled. As a result, when operating in a transparent RLP mode, neither RLP transmitter 212 nor RLP receiver 232 stores RLP frames in a corresponding RLP input buffer 108, 138, 156 or resequencing buffer 110, 140, 158. In addition, RLP receiver 232 does not NAK erroneously received frames and RLP transmitter 212 and RLP receiver 232 do not exchange messages with respect to a window size of RLP frames buffered in the corresponding RLP buffer.

During the communication session, one or more of transmitting communication device 202 and receiving communication device 222 determines (306) an air interface quality with respect to the link 120, 122 of air interface 118 comprising the assigned traffic channel. For example, during the communication session, MS 102, or transceiver 132 and/or controller 150, whichever is acting as receiving communication device 222, may determine an air interface quality based on based on one or more signals received via the traffic channel assigned in forward link 120 or reverse link 122, whichever is appropriate. That is, MS 102 may measure a quality of a signal received via the traffic channel assigned in forward link 120 and transceiver 132/controller 150 may measure a quality of a signal received via the traffic channel assigned in reverse link 122.

For example, an air interface quality measurement may comprise a signal quality metric determined with respect to a received signal, such as a frame error rate (FER) or a bit error rate (BER) that is determined for received frames, a received signal strength associated with the received signal, or a signal-to-noise ratio (SNR), a carrier-to-interference ratio (CIR), or an $E_b/I_o$ ratio (energy per bit/interference power density (per Hertz)) that is determined for the received signal. By way of another example the air interface quality may be determined based on a persistence of air interface conditions that result in a quantity of H-ARQ aborts, that is, a quantity of frames aborted by H-ARQ function 208 of transmitting communication device 202, or a quantity of queue stalls within a designated time period. The quantity of H-ARQ aborts or queue stalls may be counted by transmitting communication device 202 or by receiving communication device 222. Other air interface quality measurements may occur to one of ordinary skill in the art, which other air interface quality measurements may be used herein without departing from the spirit and scope of the present invention. For example, MS 102 may make signal strength or BER measurements of signaling channels or pilot channels of forward link 120, which measurements may be used herein as air interface quality measurements with respect to the assigned traffic channel of the forward link. Transmitting communication device 202 and/or receiving communication device 222 then determines an air interface quality metric by comparing the air interface quality measurement or quantity of H-ARQ aborts or queue stalls, to a corresponding threshold, such as an FER, BER, signal strength, SNR, CIR, $E_b/I_o$, 'H-ARQ aborts,' or 'queue stalls' threshold that is stored in the at least one memory device, such as at least one memory devices 106, 136, and 154, of the communication device.

Based on the determined air interface quality metric, transmitting communication device 202 or receiving communication device 222, preferably whichever device determines the metric, then determines (308) whether to change an RLP mode of operation for the traffic channel assigned in the measured link 120, 122. When the metric indicates an RLP mode of operation other than the current operating mode, then transmitting communication device 202 and receiving communication device 222 each sets a new RLP mode of operation by changing (310) operating modes. When the metric indicates a same RLP mode as the current operating mode, then transmitting communication device 202 and receiving communication device 222 maintain (312) the current RLP mode of operation. However, in another embodiment of the present invention, based on the determined air interface quality metric, the transmitting communication device or the receiving communication device, whichever is appropriate, may determine whether to switch RLP modes for the traffic channels of a link other than the measured link or of both links 120, 122. For example, communication system 100 may assume that if one measured link 120, 122 is good, then both links are likely to be good, and if one measured link is poor, then both links are likely to be poor.

For example, when the RLP mode of operation is a non-transparent mode and the air interface quality metric compares favorably to a threshold, indicating good RF conditions, then each of transmitting communication device 202 and receiving communication device 222 switches to a transparent mode of operation. A favorable comparison to a threshold may comprise an FER, BER, or quantity of H-ARQ aborts measurement that fall below a corresponding threshold or a signal strength, SNR, CIR, or $E_b/I_o$ measurement that are above a corresponding threshold. However, if transmitting communication device 202 and the receiving communication device 222 are already operating in the transparent mode, then they maintain the transparent mode of operation. Similarly, when the RLP mode of operation is a transparent mode and the air interface quality metric compares unfavorably to a threshold, indicating poor RF conditions, then each of transmitting communication device 202 and receiving communication device 222 switches to a non-transparent mode of operation. However, if the transmitting communication device and the receiving communication device are already operating in the non-transparent mode, then they maintain the non-transparent mode of operation.

In order to change an RLP mode of operation, the communication device 202, 222 that determines to change RLP modes, and more particularly the processor, such as processors 104, 134, and 152, of the communication device, changes its own mode of operation and further assembles a message informing of a change in an RLP mode of operation with respect to the measured link. The communication device then conveys the assembled message to the other communication device. In one embodiment of the present invention, a communication device 202, 222, may inform the other communication device of the change in an RLP mode of operation by informing of a change in a number of rounds of NAKs and re-transmissions before aborting a frame. For example, a communication device 202, 222, may inform of a change from a non-transparent mode of operation to a transparent mode of operation for a forward link 120 of air interface 118 by assembling and conveying, to the other communication device, a Service Request Message that comprises an RLP BLOB in which a NAK_ROUNDS_REV parameter, that is, a number of rounds of NAKs and re-transmissions before aborting a frame, is set to '0.' Further, the communication device may inform of a change from a non-transparent mode of operation to a transparent mode of operation for reverse link 122 of air interface 118 by assembling and conveying a Service Request Message that comprises an RLP BLOB in which a NAK_ROUNDS_FWD parameter is set to '0.' When the other communication device receives the message with the NAK_ROUNDS_FWD parameter or the NAK_ROUNDS_REV parameter set to '0,' the other communication device changes to a transparent RLP mode of operation and disables the communication device's RLP transmitter 212 or RLP receiver 232, whichever is appropriate.

Similarly, the communication device may inform of a change from a transparent mode of operation to a non-transparent mode of operation for forward link 120 by assembling and conveying, to the other communication device, a Service Request Message that comprises an RLP BLOB in which a NAK_ROUNDS_REV parameter is set to a value other than '0.' Further, the communication device may inform of a change from a transparent mode of operation to a non-transparent mode of operation for a reverse link 122 by conveying a Service Request Message that comprises an RLP BLOB in which a NAK_ROUNDS_FWD parameter is set to a value other than '0.' Those who are of ordinary skill in the art realize that other messages may be used by a communication device to instruct another communication device to switch RLP modes, for example, by embedding a single bit in an unused data field of a currently exchanged signaling message, which bit indicates whether to enable or disable a corresponding RLP transmitter 212 or receiver 232. When the other communication device receives the message with the NAK_ROUNDS_FWD parameter or the NAK_ROUNDS_REV parameter set to a value other than '0,' the other communication device changes to a non-transparent RLP mode of operation and enables the communication device's RLP transmitter 212 or RLP receiver 232, whichever is appropriate.

Steps 306, 308, 310, and 312 may then be repeated (314), intermittently or periodically, until the communication session ends, and logic flow 300 then ends (316).

By switching an RLP mode of operation during a communication session, a potential for queue stalls is minimized. That is, when air interface conditions are poor, the transmitting and receiving communication devices may operate in a non-transparent, highly reliable, RLP mode in which queue stalls are possible. However, when air interface conditions are good and use of a reliable transport protocol is less important, the transmitting and receiving communication devices may operate in a transparent RLP mode in which queue stalls are not possible. Based on determinations of the air interface conditions, the transmitting and receiving communication devices are able to toggle back and forth between transparent and non-transparent RLP modes of operation, thereby minimizing an opportunity for queue stalls.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for minimizing an occurrence of a queue stall during a communication session involving a mobile station and another device and employing a reliable transport protocol, the method comprising:
    setting a current Radio Link Protocol (RLP) mode of operation for the communication session; and
    during the communication session, switching, in association with a traffic channel assigned to the mobile station and communication session, from a current RLP mode of operation for the communication session to an RLP mode of operation for the communication session that is different from the current RLP mode of operation, wherein one of the current RLP mode and the different RLP mode of operation is a transparent RLP mode of operation and the other mode is a non-transparent RLP mode of operation, wherein switching from the current RLP mode of operation to the different RLP mode of operation comprises at least one of transmitting from the mobile station to the another device a service request message indicating that the another device should change RLP mode, or receiving at the mobile station from the another device a service request message indicating that the mobile station should change RLP mode.

2. The method of claim 1, wherein setting comprises setting the transparent mode of operation for a Radio Link Protocol (RLP) and wherein switching comprises switching to the non-transparent RLP mode of operation.

3. The method of claim 2, further comprising, subsequent to switching to the non-transparent Radio Link Protocol (RLP) mode of operation, switching back to a transparent RLP mode of operation.

4. The method of claim 1, wherein setting comprises setting the non-transparent mode of operation for a Radio Link Protocol (RLP) and wherein switching comprises switching to the transparent RLP mode of operation.

5. The method of claim 4, further comprising, subsequent to switching to the transparent Radio Link Protocol (RLP) mode of operation, switching back to a non-transparent RLP mode of operation.

6. The method of claim 1, wherein switching comprises:
    comparing a determined quality of an air interface to a threshold;
    when the determined quality compares unfavorably to the threshold and the current Radio Link Protocol (RLP) mode of operation is the transparent mode of operation, switching to the non-transparent mode of operation; and
    when the determined quality compares favorably to the threshold and the current Radio Link Protocol (RLP) mode of operation is the non-transparent mode of operation, switching to the transparent mode of operation.

7. The method of claim 6, further comprising:
when the determined quality compares unfavorably to the threshold and the current Radio Link Protocol (RLP) mode of operation is a non-transparent mode of operation, maintaining the current mode of operation; and
when the determined quality compares favorably to the threshold and the current Radio Link Protocol (RLP) mode of operation is a transparent mode of operation, maintaining the current mode of operation.

8. The method of claim 1, wherein determining a quality of an air interface comprises determining one or more of a quantity of Hybrid Automatic Repeat Request (H-ARQ) aborts and a quantity of queue stalls.

9. The method of claim 1, wherein switching comprises conveying a message informing of a change in a number of rounds of negative acknowledgements (NAKs) before aborting a frame.

10. The method of claim 1, wherein switching comprises:
determining a quality of an air interface; and
switching the RLP mode of operation during the communication session based on the determined quality of the air interface.

11. A communication device that changes a mode of operation of a Radio Link Protocol (RLP) during a communication session involving a mobile station and another device, the communication device comprising:
means for setting a current RLP mode of operation for the communication session; and
means for switching, during the communication session and in association with a traffic channel assigned to the mobile station and communication session, from a current RLP mode of operation for the communication session to an RLP mode of operation for the communication session that is different from the current RLP mode of operation, wherein one of the current RLP mode and the different RLP mode of operation is a transparent RLP mode of operation and the other mode is a non-transparent RLP mode of operation, wherein switching from the current RLP mode of operation to the different RLP mode of operation comprises at least one of transmitting from the mobile station to the another device a service request message indicating that the another device should change RLP mode, or receiving at the mobile station from the another device a service request message indicating that the mobile station should change RLP mode.

12. The communication device of claim 11, wherein the means for setting comprises a means for setting the transparent mode of operation for a Radio Link Protocol (RLP) and wherein the means for switching comprises a means for switching to the non-transparent RLP mode of operation.

13. The communication device of claim 12, further comprising a means for switching back to a transparent RLP mode of operation subsequent to switching to the non-transparent Radio Link Protocol (RLP) mode of operation.

14. The communication device of claim 11, wherein the means for setting comprises a means for setting the non-transparent mode of operation for a Radio Link Protocol (RLP) and wherein the means for switching comprises a means for switching to the transparent RLP mode of operation.

15. The communication device of claim 14, further comprising a means for switching back to a non-transparent RLP mode of operation subsequent to switching to the transparent Radio Link Protocol (RLP) mode of operation.

16. The communication device of claim 11, wherein the means for switching comprises:
means for comparing a determined quality of an air interface to a threshold;
means for switching to the non-transparent mode of operation when the determined quality compares unfavorably to the threshold and the current Radio Link Protocol (RLP) mode of operation is the transparent mode of operation; and
means for switching to the transparent mode of operation when the determined quality compares favorably to the threshold and the current Radio Link Protocol (RLP) mode of operation is the non-transparent mode of operation.

17. The communication device of claim 16, further comprising:
means for maintaining the current mode of operation when the determined quality compares unfavorably to the threshold and the current Radio Link Protocol (RLP) mode of operation is a non-transparent mode of operation; and
means for maintaining the current mode of operation when the determined quality compares favorably to the threshold and the current Radio Link Protocol (RLP) mode of operation is a transparent mode of operation.

18. The communication device of claim 11, wherein the means for determining a quality of an air interface comprises a means for determining one or more of a quantity of Hybrid Automatic Repeat Request (H-ARQ) aborts and a quantity of queue stalls.

19. The communication device of claim 11, wherein the means for switching comprises:
means for assembling a message informing of a change in a number of rounds of negative acknowledgements (NAKs) before aborting a frame; and
means for conveying the assembled message.

20. The communication device of claim 11, wherein the means for switching comprises:
means for determining a quality of an air interface; and
means for switching the RLP mode of operation during the communication session based on the determined quality of the air interface.

* * * * *